(12) United States Patent
Dietz

(10) Patent No.: US 7,051,690 B2
(45) Date of Patent: May 30, 2006

(54) INTERNAL-COMBUSTION ENGINE WITH A DEVICE FOR HYDRAULICALLY ADJUSTING THE ANGLE OF ROTATION OF THE CAMSHAFT RELATIVE TO THE CRANKSHAFT AND A VACUUM PUMP FOR A SERVO LOAD, ESPECIALLY A BRAKE BOOSTER

(75) Inventor: Joachim Dietz, Frensdorf (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/157,354

(22) Filed: Jun. 21, 2005

(65) Prior Publication Data
US 2005/0274345 A1 Dec. 15, 2005

Related U.S. Application Data

(63) Continuation of application No. PCT/EP03/13337, filed on Nov. 27, 2003.

(30) Foreign Application Priority Data
Dec. 21, 2002 (DE) ................ 102 60 546

(51) Int. Cl.
F01L 1/34 (2006.01)

(52) U.S. Cl. ............... 123/90.17; 123/90.15; 123/90.31

(58) Field of Classification Search ............. 123/90.17, 123/90.15, 90.31
See application file for complete search history.

(56) References Cited

U.S. PATENT DOCUMENTS 4,662,320 A 5/1987 Moriya
5,305,718 A 4/1994 Müller
5,839,401 A * 11/1998 Gruber et al. ........... 123/90.31

FOREIGN PATENT DOCUMENTS

| DE | 85 18 157 | 10/1986 |
|---|---|---|
| DE | 41 05 144 | 8/1992 |
| GB | 687125 | 2/1953 |

* cited by examiner

Primary Examiner—Thomas Denion
Assistant Examiner—Zelalem Eshete
(74) Attorney, Agent, or Firm—Volpe and Koenig, P.C.

(57) ABSTRACT

An internal combustion engine having a device for hydraulically adjusting the angle of rotation of the camshaft thereof relative to the crankshaft thereof is provided, which also includes a vacuum pump for a servo load. The device includes a drive unit that is connected in a driving manner to the crankshaft and an output unit which is connected in a torsion-proof manner to the camshaft. The lubricating oil of the internal combustion engine, which is fed from a radial bearing of the camshaft in the cylinder head, is used as a hydraulic pressurizing medium for the device. Thee vacuum pump includes a housing that has a flanged connection to the cylinder head cover, and a rotor that is disposed therein and is provided with a drive shaft via which the vacuum pump is driven and lubricated. The vacuum pump is arranged in an axial direction relative to the device, while the device is provided with additional coupling elements via which the drive shaft od the vacuum pump is connected in a driving manner to the device. The vacuum pump is lubricated by lubricating oil from the internal combustion engine, which is delivered to the device as the pressurizing medium.

7 Claims, 2 Drawing Sheets

INTERNAL-COMBUSTION ENGINE WITH A DEVICE FOR HYDRAULICALLY ADJUSTING THE ANGLE OF ROTATION OF THE CAMSHAFT RELATIVE TO THE CRANKSHAFT AND A VACUUM PUMP FOR A SERVO LOAD, ESPECIALLY A BRAKE BOOSTER

CROSS-REFERENCE TO RELATED APPLICATIONS

This application is a continuation of PCT/EP2003/013337, filed Nov. 27, 2003, which is incorporated by reference as fully set forth herein.

BACKGROUND

The invention relates to an internal-combustion engine comprising a device for hydraulically adjusting the angle of rotation of the camshaft of the engine relative to the crankshaft of the engine, as well as to a vacuum pump for a servo load, especially for a brake booster.

For the person skilled in the art in the field of automotive technology, it is generally known that, in addition to a plurality of aggregate systems, modern internal-combustion engines are also equipped with a device for hydraulically adjusting the angle of rotation of the camshaft of the engine relative to the crankshaft of the engine, as well as with a vacuum pump for a servo load, in order, on one hand, to be able to continuously change the opening and closing valve timing of the gas-exchange valves of the internal-combustion engine with the device and, on the other hand, to generate with the vacuum pump the low pressure needed, for example, for a brake booster of a motor vehicle.

The typical devices for adjusting the angle of rotation are provided, in principle, as hydraulic actuators, which are configured either as so-called axial piston adjusters or as so-called rotary piston adjusters similar to the device known from EP 0 818 609 B1. This device is arranged on the drive-side end of the camshaft supported in several radial bearings in the cylinder head of the internal-combustion engine, and essentially consists of a drive unit connected in a driving manner to the crankshaft of the internal-combustion engine and a driven unit connected in a torsion-proof manner to the camshaft of the internal-combustion engine. The actual driven unit is provided as an impeller and fixed by an axial central screw to the camshaft, while the drive unit is provided as a hollow cylinder, which surrounds the driven unit and which can be sealed tight relative to a pressurizing medium by two axial side walls. Through four radial limiting walls in the drive unit and four radial vanes on the driven unit, two compression chambers, which can be pressurized alternately or simultaneously with a hydraulic pressurizing medium and via which the drive unit is connected in a force-transferring way to the driven unit, are then formed between two limiting walls within the device. Here, the lubricating oil fed from one of the radial bearings of the camshaft for the internal-combustion engine is used. This oil is supplied via radial and axial oil channels of the device as hydraulic pressurizing medium for the device.

In contrast, the vacuum pumps typically used in internal-combustion engines for a servo load are usually provided as vane pumps, like those that follow, for example, from DE 85 18 157 U1. This vacuum pump is arranged on a common longitudinal axis with the camshaft on the cylinder head of the internal-combustion engine, and essentially consists of a housing flanged to the cylinder head cover of the internal-combustion engine with a pillow block and a rotor arranged in the housing with a drive shaft, which is supported in a rotating manner in the pillow block of the housing projecting into the cylinder head of the internal-combustion engine. Here, two recesses, in which two coupling tabs formed on the end face of the camshaft engage, are machined into the end face of the drive shaft and thus the rotational movement of the camshaft is transferred to the drive shaft of the vacuum pump. In addition, the camshaft also has an axial lubricating oil channel, which leads to the end face of the camshaft and which is connected, on one side, via a coupling tube to an axial lubricating oil collection space in the drive shaft of the vacuum pump and, on the other side, to the lubricating oil circuit of the internal-combustion engine, so that the vacuum pump is simultaneously lubricated with the lubricating oil of the internal-combustion engine.

However, it has proven to be disadvantageous that for many engine designs, due to lack of space, there is no other economical option than to arrange the vacuum pump for the servo load opposite the drive-side end of the camshaft or one of the camshafts of the internal-combustion engine. However, if a device for hydraulically adjusting the angle of rotation is also provided on this end of the camshaft, then the driving and lubrication of the vacuum pump in the described manner via the camshaft of the internal-combustion engine is no longer possible, so that very expensive measures are usually necessary to realize the driving and lubrication of the vacuum pump in some other way. Here, primarily changing the vacuum pump in its structure must be taken into consideration, such that it can be integrated in a suitable way in the primary or secondary drive of the internal-combustion engine, as well as in the lubricating-oil circuit thereof, so that in each case, considerable extra expense for the internal-combustion engine must be taken into account.

SUMMARY

Therefore, the invention is based on the objective of providing an internal-combustion engine with a device for adjusting the angle of rotation of the camshaft of the engine relative to the crankshaft of the engine, as well as with a vacuum pump for a servo load, especially for a brake booster, in which, despite a device for adjusting the angle of rotation fixed on the drive-side end of the camshaft of the engine, a vacuum pump arranged typically on the cylinder head of the internal-combustion engine can be used with economical driving and simple lubrication.

According to the invention, this objective is met for an internal-combustion engine according to the invention in which the vacuum pump is arranged in the axial direction relative to the device for adjusting the angle of rotation on a common longitudinal axis with the device on the cylinder head of the internal-combustion engine and the device is provided with additional coupling elements, through which the drive shaft of the vacuum pump is connected in a driving manner to the device, and the lubrication of the vacuum pump is realized by a central connecting tube, which is arranged in the drive shaft of the pump and which projects into the device, with the lubricating oil of the internal-combustion engine supplied to the device as a pressurizing medium.

In one embodiment of the internal-combustion engine according to the invention, the coupling arranged on the drive shaft for the vacuum pump is formed preferably by two radial teeth arranged coaxial on its end face facing the device, while the additional coupling elements are formed on the device preferably as two radial slots complementary to the radial teeth on the drive shaft. It has proven to be especially advantageous to provide the two radial teeth as rectangular extensions, which project from the end face of the drive shaft facing the device, which are arranged directly opposite each other offset by 180°, and which are formed integrally with the drive shaft. In similar corresponding embodiments, however, it is also possible to arrange more than two radial teeth symmetrically or asymmetrically on the end face of the drive shaft and/or to attach these as separate parts, for example, in corresponding grooves or also as pins in corresponding bores, on the end face of the drive shaft of the vacuum pump.

In another embodiment of the internal-combustion engine according to the invention, the opposite side (from the camshaft) of the device for adjusting the angle of rotation is then formed such that the axial central screw of the device is arranged countersunk with its screw head pointing towards the vacuum pump into an expanded diameter section of the screw bore in the driven unit of the device, wherein the side wall of the device facing away from the camshaft has an axial through hole with the same diameter as the expanded diameter section of the screw bore in the drive unit of the device, through which the axial central screw is led.

In one embodiment of the internal-combustion engine according to the invention, this expanded diameter section for the screw head of the central screw in the driven unit is connected to one of the oil channels for supplying pressurizing medium to the device and can be sealed oil tight by a cap that can be screwed into the through hole of equal size in the side wall of the device facing away from the camshaft. For this purpose, the essentially disk-shaped cap is provided with a coaxial annular projection with an external thread on its seal side, whose length corresponds approximately to a thickness of the side wall of the device that faces away from the camshaft and formed with an internal thread in its through hole. This cap then has the two radial slots provided as two pocket grooves for the coupling of the vacuum pump, which has two radial teeth on the end face of the drive shaft. The grooves extend from the edge of the cap and which are offset by 180° relative to each other or are directly opposite each other. By means of these teeth, the vacuum pump is driven by the device for adjusting the angle of rotation. In addition, in a central axial bore in this cap, the connecting tube of the vacuum pump is held in a sealed manner relative to the device for adjusting the angle of rotation, through which a portion of the pressurizing medium led in the expanded diameter section for the screw head of the central screw is further guided to the device without leakage as lubricating oil into the vacuum pump.

In contrast, in another embodiment of the internal-combustion engine embodied according to the invention, it is proposed to not connect the expanded diameter section for the screw head of the central screw in the driven unit of the device to the pressurizing medium supply to the device and consequently also not to use an additional cap that can be screwed into the side wall of the device facing away from the camshaft for sealing. In this embodiment, for realizing the drive of the vacuum pump by the device for adjusting the angle of rotation, the two radial slots for the coupling of the vacuum pump through the two radial teeth on the end face of the drive shaft are preferably provided as pocket grooves, which are machined directly into the side wall of the device facing away from the camshaft and which extend into the side wall of the device in front of the through hole leading to the expanded diameter section for the screw head of the central screw and are likewise arranged offset by 180° relative to each other or directly opposite each other. In the opening on the side of the screw head for a continuous longitudinal bore provided for supplying pressurizing medium to the device in the axial screw head of the device for adjusting the angle of rotation, then the connecting tube of the vacuum pump is held in a sealed manner relative to the device, through which, similar to the first embodiment, a portion of the pressurizing medium led into the device is further led without leakage as lubricating oil into the vacuum pump.

The internal-combustion engine provided according to the invention with a device for hydraulically adjusting the angle of rotation of the camshaft of the engine relative to the crankshaft of the engine and also with a vacuum pump for a servo load, especially for a brake booster, has the advantage, in comparison with the internal-combustion engines known from the state of the art, that it is now possible through the creation of an economical drive connection between the device for adjusting the angle of rotation and the vacuum pump through a positive-fit coupling, as well as through the simultaneous use of a portion of the pressurizing medium of the device as lubricating oil for the vacuum pump by means of a simple connecting tube between the device and the vacuum pump, despite the presence of the device for adjusting the angle of rotation arranged at the drive-side end of the camshaft, to arrange the vacuum pump typically on a common longitudinal axis with the camshaft on the cylinder head cover of the internal-combustion engine. Therefore, the vacuum pump does not have to be adapted either in its structure or in its arrangement to a different drive and/or to different lubrication, so that the extra cost required for this purpose for the internal-combustion engine can be saved. However, by leaving out the connecting tube between the vacuum pump and the device for adjusting the angle of rotation and configuring the cap sealing, the expanded diameter section in the device without a central axial bore or formation of the through hole in the central screw as a basic bore, it is also possible to realize only the drive of the vacuum pump in a way according to the invention by the device for adjusting the angle of rotation and to provide a separate lubricating oil supply for the vacuum pump.

BRIEF DESCRIPTION OF THE DRAWINGS

The invention is explained in more detail below with reference to two preferred embodiments which are shown schematically in the associated drawings. In the drawings.

DETAILED DESCRIPTION OF THE PREFERRED EMBODIMENTS

Figure 1:
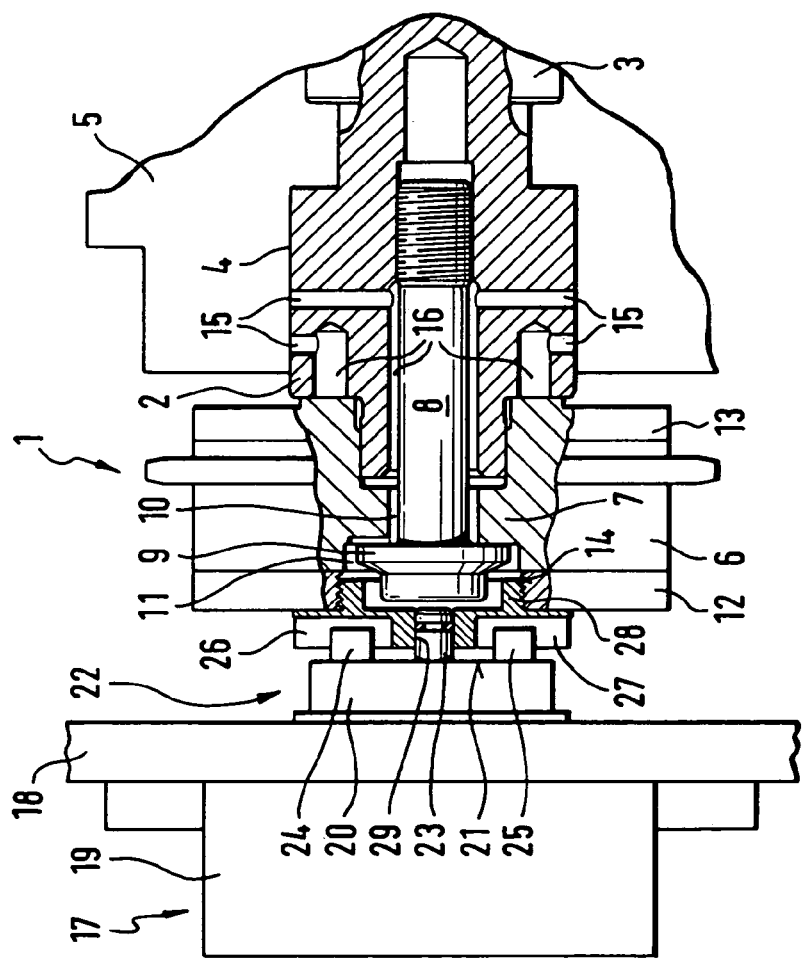
FIG. 1 is a partial cross sectional view through the cylinder head of a first embodiment of the internal-combustion engine according to the invention.
Figure 3:
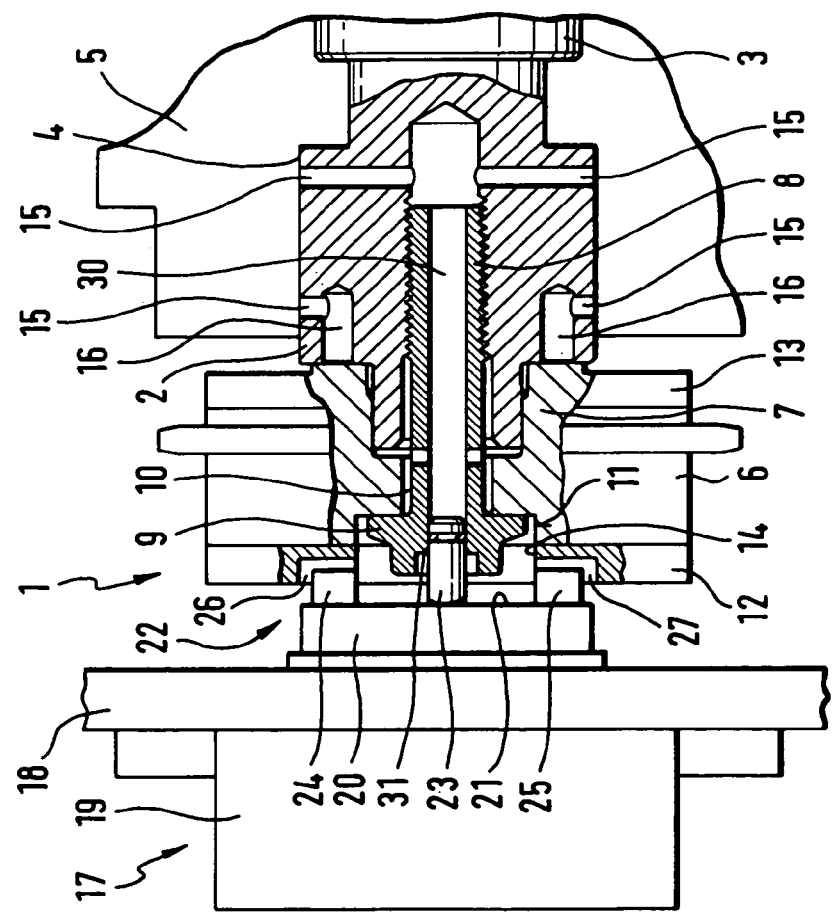
FIG. 3 is a partial cross sectional view through the cylinder head of a second embodiment of the internal-combustion engine formed according to the invention.

FIGS. 1 and 3 each show a partial view of an internal-combustion engine, which has both a device 1 for hydraulically adjusting the angle of rotation of the camshaft 3 of the engine relative to the crankshaft of the engine and also a vacuum pump 17 for a servo load, especially for a brake booster of a motor vehicle. Here, it is clear to see in both figures that the device 1 formed in principle as a hydraulic actuator for hydraulically adjusting the angle of rotation is arranged on the drive-side end 2 of the camshaft 3 supported in several radial bearings 4 in the cylinder head 5 of the internal-combustion engine and essentially is formed of a drive unit 6 connected in a driving manner to the crankshaft by a tension means and also a driven unit 7 connected in a torsion-proof manner to the camshaft 3 of the internal-combustion engine. Here, the driven unit 7 of the device 1 is fixed by an axial central screw 8 on the drive-side end 2 of the camshaft 3, while the drive unit 6 is formed by a hollow cylinder, which surrounds the driven unit 7 and which is sealed tight relative to a pressurizing medium by two axial side walls 12, 13. Throught he use of at least two compression chambers, which are formed within the device 1 and which can be pressurized alternately or simultaneously with a hydraulic pressurizing medium, the drive unit 6 is then connected in a force-transferring manner to the driven unit 7, wherein the lubricating oil of the internal-combustion engine taken from one of the radial bearings 4 of the camshaft is used as hydraulic pressurizing medium for the device 1, which is supplied via radial and axial oil channels 15, 16 into the camshaft 3 of the device 1.

In contrast, the vacuum pump 17, shown schematically in FIGS. 1 and 3, is provided as a vane pump, which essentially includes of a housing 19 with a flanged connection to the cylinder head cover 18 of the internal-combustion engine and a rotor arranged in the housing 19 with a drive shaft 20, which projects into the cylinder head 5 of the internal-combustion engine and on the end face has a coupling 22 for transferring a rotational movement. Because the typical transfer of the rotational movement of the camshaft 3 to the vacuum pump 17 and also the lubrication of the same with the lubricating oil of the internal-combustion engine via the drive shaft 20 of the vacuum pump 17 through the device 1 for adjusting the angle of rotation arranged on the drive-side end 2 of the camshaft 3 is no longer possible, the vacuum pump 17 is arranged according to the invention in an axial direction to the device 1 on a common longitudinal axis with this part and the device 1 is formed with additional coupling elements, through which the drive shaft 20 of the vacuum pump 17 is now connected in a driving manner to the device 1. The lubrication of the vacuum pump 17 is provided according to the invention by a connecting tube 23, which can be seen equally in FIGS. 1 and 3, which is arranged in the drive shaft 20 of the vacuum pump 17, which projects into the device 1, and which further leads a portion of the lubricating oil of the internal-combustion engine delivered to the device 1 as a pressurizing medium into the vacuum pump 17.

In addition, it follows from FIGS. 1 and 3 that the coupling 22 arranged on the drive shaft 20 of the vacuum pump 17 for transferring rotational movement is formed by two coaxial radial teeth 24, 25 arranged on its end face 21 facing the device, while the additional coupling elements on the device 1 are provided as two radial slots 26, 27, which are arranged on the side of the device 1 opposite the drive shaft 20, which are complementary to the radial teeth 24, 25 on the drive shaft 20, and in which the radial teeth 24, 25 can be inserted. The opposite side of the device 1 for adjusting the angle of rotation is here provided such that the axial central screw 8 of the device 1 is arranged countersunk with its screw head 9 in an expanded diameter section 11 of the screw bore 10 thereof in the drive unit 7 of the device 1, and the side wall 12 of the device 1 facing away from the camshaft has an axial through hole 14 of equal diameter, through which the axial central screw 8 is guided.

Figure 2:
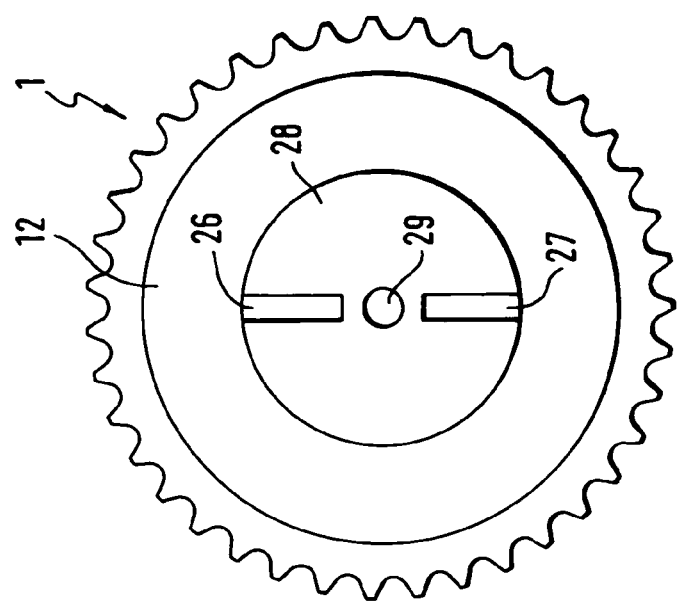
FIG. 2 is a plan view of the device for adjusting the angle of rotation of the first embodiment of the internal-combustion engine formed according to the invention.

In the first embodiment of the internal-combustion engine formed according to the invention shown in FIGS. 1 and 2, this expanded diameter section 11 for the screw head 9 of the central screw 8 can be seen clearly connected to one of the axial oil channels 16 for supplying pressurizing medium to the device 1 and is sealed tight relative to oil by a cap 28 that can be screwed into the through hole 14 in the side wall 12 of the device 1 facing away from the camshaft. This cap 28 on the side wall 12 of the device 1 facing away from the camshaft then has the two radial slots 26, 27 for the coupling 22 of the vacuum pump 17, which, as can be seen in FIG. 2, are formed as two pocket grooves extending from the edge of the cap 28 and arranged directly opposite one another. In addition, in a central axial bore 29 in this cap 28, the connecting tube 23 of the vacuum pump 17 for the device 1 is held in a sealed manner, through which a portion of the pressurizing medium of the device 1 that is led into the expanded diameter section 11 for the screw head 9 of the central screw 8 is further led as lubricating oil into the vacuum pump 17.

Figure 4:
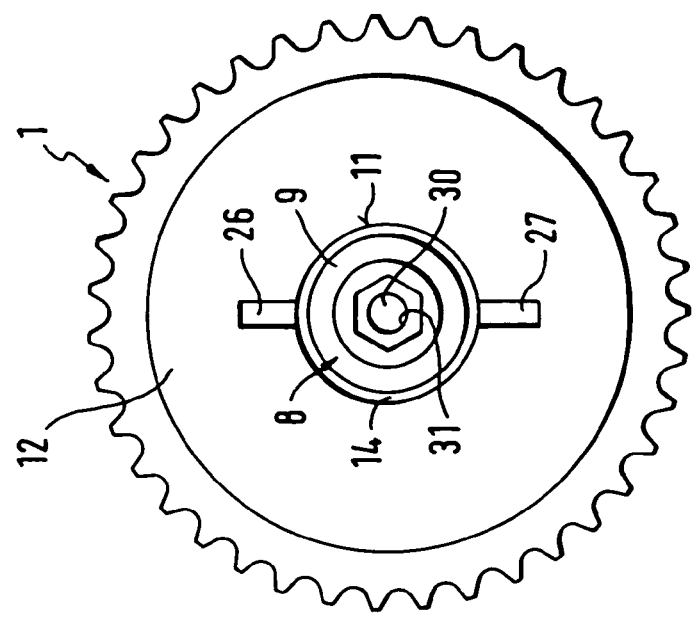
FIG. 4 is a plan view of the device for adjusting the angle of rotation of the second embodiment of the internal-combustion engine formed according to the invention.

In contrast, in the second embodiment of the internal-combustion engine formed according to the invention shown in FIGS. 3 and 4, the expanded diameter section 11 for the screw head 9 of the central screw 8 can be seen clearly not connected to the pressurizing medium supply of the device 1, because for the pressurizing medium supply of device 1, a continuous longitudinal bore 30 in the axial central screw 8 is provided. Thus, because also no cap 28 for sealing the expanded diameter section 11 or the through hole 14 in the side wall 12 of the device 1 facing away from the camshaft is necessary, the radial slots 26, 27 for the coupling 22 of the vacuum pump 17 in this embodiment are provided as pocket grooves, which are machined directly into the side wall 12 of the device 1 facing away from the camshaft and which, as FIG. 4 clearly shows, extend from the through hole 14 to the expanded diameter section 11 into the drive unit 7 and are arranged directly opposite one another. In the screw head-side opening 31 of the longitudinal bore 30 in the central screw 8 of the device 1, the connecting tube 23 of the vacuum pump is held in a sealed manner relative to the device 1, through which a portion of the pressurizing medium led into the device 1 is further led as lubricating oil into the vacuum pump 17.

LIST OF REFERENCE NUMBERS

1 Device
2 Drive-side end
3 Camshaft
4 Radial bearing
5 Cylinder head
6 Drive unit
7 Driven unit
8 Central screw
9 Screw head
10 Screw bore
11 Expanded diameter section
12 Side wall
13 Side wall
14 Through hole
15 Radial oil channels
16 Axial oil channels
17 Vacuum pump
18 Cylinder head cover
19 Housing 20 Drive shaft
21 End side
22 Coupling
23 Connecting tube
24 Radial tooth
25 Radial tooth
26 Radial slot
27 Radial slot
28 Cap
29 Axial bore
30 Longitudinal bore
31 Opening

The invention claimed is:

1. Internal-combustion engine with a device for hydraulically adjusting an angle of rotation of a camshaft of the engine relative to a crankshaft of the engine, as well as with a vacuum pump for a servo load, comprising the device (1) for hydraulically adjusting the angle of rotation is arranged on a drive-side end (2) of the camshaft (3) supported in several radial bearings (4) in a cylinder head (5) of the internal-combustion engine and is formed as a hydraulic actuator, the device (1) includes a drive unit (6) connected in a driving manner to the crankshaft of the internal-combustion engine and a driven unit (7) connected in a torsion-proof manner to the camshaft (3) of the internal-combustion engine, the driven unit (7) is fixed by an axial central screw (8) on the camshaft (3) and the drive unit (6) is provided as a hollow cylinder, which surrounds the driven unit (7) and which is sealed tight relative to a pressurizing medium by two axial side walls (12, 13), the drive unit (6) is connected in a force-transferring manner to the driven unit (7) of the device (1) through at least two compression chambers, which are formed within the device (1) and which can be pressurized alternately or simultaneously with a hydraulic pressurizing medium, a lubricating oil of the internal-combustion engine taken from one of the radial bearings (4) of the camshaft (3) is used as the hydraulic pressurizing medium for the device (1), and is supplied via radial and axial oil channels (15, 16) into the camshaft (3) of the device (1), the vacuum pump (17) for the servo load comprises a vane pump and includes a housing (19) connected to the cylinder head cover (18) of the internal-combustion engine and a rotor arranged therein with a drive shaft (20), the drive shaft (20) projects toward the cylinder head (5) of the internal-combustion engine and includes an end-face coupling (22) for a transfer of rotational movement of the camshaft (3) to the vacuum pump (17), as well as lubrication of the vacuum pump with the lubricating oil of the internal-combustion engine, the vacuum pump (17) is arranged in an axial direction relative to the device (1) on a common longitudinal axis and the device (1) is includes an additional coupling element for connection with the drive shaft (20) of the vacuum pump (17) in a driving manner to the device (1), the lubrication of the vacuum pump (17) is provided via a central connecting tube (23) arranged in the drive shaft (20) of the vacuum pump that projects into the device (1) which receives the lubricating oil of the internal-combustion engine delivered to the device (1) as the pressurizing medium.

2. Device according to claim 1, wherein the coupling (22) arranged on the drive shaft (20) of the vacuum pump (17) is formed by two radial teeth (24, 25) arranged on an end face (21) of the shaft facing the device and the additional coupling elements on the device (1) are formed by two complementary radial slots (26, 27).

3. Device according to claim 2, wherein the axial central screw (8) has a screw head (9) that is arranged countersunk in an expanded diameter section (11) of a screw bore (10) in the driven unit (7), and a side wall (12) of the device (1) facing away from the camshaft has an axial through hole (14) of equal diameter.

4. Device according to claim 3, wherein the expanded diameter section (11) for the screw head (9) of the central screw (8) is connected to an oil channel (16) for supplying the pressurizing medium to the device (1) and is sealable in an oil-tight manner by a cap (28) that can be screwed into the side wall (12) of the device (1) facing away from the camshaft.

5. Device according to claim 4, wherein the cap (28) on the side wall (12) of the device (1) facing away from the camshaft is provided with the two radial slots (26, 27) for the coupling (22) of the vacuum pump (17) and has a central axial bore (29), in which the connecting tube (23) of the vacuum pump (17) is held in a sealed manner relative to the device (1).

6. Device according to claim 3, wherein the radial slots (26, 27) for the coupling (22) of the vacuum pump (17) are formed as pocket grooves machined directly into the side wall (12) of the device (1) facing away from the camshaft and extend from the through hole (14) to the expanded diameter section (11) in the driven unit (7).

7. Device according to claim 6, wherein the axial central screw (8) has a continuous longitudinal bore (30) provided for supplying pressurizing medium to the device (1), and has a screw head-side opening (31) in which the connecting tube (23) of the vacuum pump (17) is held in a sealed manner relative to the device (1).

* * * * *